United States Patent
Krall et al.

(10) Patent No.: US 10,348,417 B1
(45) Date of Patent: Jul. 9, 2019

(54) SHORT PULSE WIDTH MODULATION (PWM) CODE (SPC) / SINGLE EDGE NIBBLE TRANSMISSION (SENT) SENSORS WITH INCREASED DATA RATES AND AUTOMATIC PROTOCOL DETECTION

(71) Applicant: Infineon Technologies AG, Neubiberg (DE)

(72) Inventors: Christoph Krall, Klagenfurt (AT); Dirk Hammerschmidt, Finkenstein (AT); Michael Strasser, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/850,683

(22) Filed: Dec. 21, 2017

(51) Int. Cl.
*H04B 14/02* (2006.01)
*H04L 25/49* (2006.01)

(52) U.S. Cl.
CPC ....... *H04B 14/026* (2013.01); *H04L 25/4902* (2013.01)

(58) Field of Classification Search
CPC .......................... H04B 14/026; H04L 25/4902

USPC .......................................................... 375/238
See application file for complete search history.

(56) References Cited

U.S. PATENT DOCUMENTS

| 2016/0138492 A1* | 5/2016 | Levy | F02D 29/02 701/102 |
| 2016/0223370 A1* | 8/2016 | Levy | G01D 18/00 |

* cited by examiner

*Primary Examiner* — Michael R Neff
(74) *Attorney, Agent, or Firm* — Eschweiler & Potashnik, LLC

(57) ABSTRACT

A sensor system with a sensor device communicatively coupled to a sensor bus to a receiver circuitry or processing component increases the data rate of sensor transmissions based on the sensor communication protocol. The sensor device can be a short pulse width modulation (PWM) code (SPC) protocol or a single edge nibble transmission (SENT) protocol. A first plurality of sensor values can be configured based on a first communication scheme and a second plurality of sensor values based on a second communication scheme of the communication protocol within a sensor transmission. An indication of modifications of the sensor communication protocol can further be provided via the transmission to sensor bus and processed accordingly by the receiver or processing circuitry of the sensor bus.

19 Claims, 14 Drawing Sheets

SHORT PULSE WIDTH MODULATION (PWM) CODE (SPC) / SINGLE EDGE NIBBLE TRANSMISSION (SENT) SENSORS WITH INCREASED DATA RATES AND AUTOMATIC PROTOCOL DETECTION

FIELD

The present disclosure is in the field of sensors, and more specifically, pertains to increasing data rates and enabling automatic protocol detection in SPC and SENT sensors.

BACKGROUND

Sensors such as speed or position sensors are used to provide feedback information in mechatronic systems, and are thus used as an interface between the mechanical and the electrical domain. In many cases, the positioning of a sensor is driven by mechanical constraints, for example, the available constructed space or accessibility of sensing targets (target wheel, shaft end, etc.). Therefore, in most applications the sensor cannot be embedded into the electronic control unit (ECU) but can operate as a standalone sensor (satellite sensor) that has to be connected to the control unit through a (wired) interface.

In terms of performance, the sensor interface in many conventional systems provides the "bottleneck" for the information transfer. While the sensing information (e.g., sensing and diagnostic data) is available at a much higher resolution (in time and/or accuracy) at the sensor location, it cannot be transferred and used at that resolution in the ECU because of missing connection bandwidth. Additionally, many conventional interfaces only provide a one-way data link (e.g., sensor to ECU, but not vice versa), thus a dynamic adjustment of sensor parameters or even synchronization between sensor and ECU is not possible, resulting in performance degradation of the entire system. Finally, most conventional connection schemes are point-to-point connections between sensor and ECU. In these situations, complex systems comprising several remote sensors result in complex wiring harnesses.

Automotive systems continue to increase in complexity in order to meet new requirements in terms of emission and safety. These can prevent new challenges with respect to engine and system efficiency. To continue having safe and dependable systems in automotive products, as they increase in complexity while reducing cost, smarter digital sensors are in demand. The Single Edge Nibble Transmission (SENT) digital communication protocol is a promising low-cost solution for communication between sensor satellites and a microcontroller. Short PWM code (SPC) provides application relevant functionalities which are not included in SENT while still keeping as close as possible to the original protocol. However, SPC adds bi-directionality, synchronicity and bus capability. The SPC protocol can aim to extending the SENT communication link in terms of functionality, performance and cost efficiency.

Sensor systems can generally use pin-to-pin interfaces for sensors. Typical implementations are single-ended voltage interfaces (with 3 wires per sensor, such as SENT (single edge nibble transmission), SPC (short PWM (pulse width modulation) code, etc.) or current interfaces (with 2 wires per sensor, such as those used in ABS (anti-lock braking system) or transmission speed sensors). Conventional interface varieties include digital voltage interfaces, analog voltage interfaces, basic current interfaces, and complex current interfaces.

In digital voltage interfaces, SENT is a universal interface used to transfer a digital data stream to the ECU (e.g., unidirectionally) without synchronization and bus capability. SPC can represent an extension of SENT, enabling synchronization and basic bus capability. The implementation of the physical layer interface can be basic, thus the available bandwidth (and therefore the resulting baud rate) of the interface be limited (20 kBaud). Due to the basic implementation, the interface exhibits a high vulnerability when exposed to electromagnetic interference (EMI) or electrostatic discharge (ESD). A strong benefit of SENT/SPC can be the low complexity of the physical layer and the possibility to transfer digital data comprising both sensing and diagnostic data. However, due to the low update rate, it can be insufficient for many applications (e.g. rotor position sensing).

DETAILED DESCRIPTION

Figure 1:
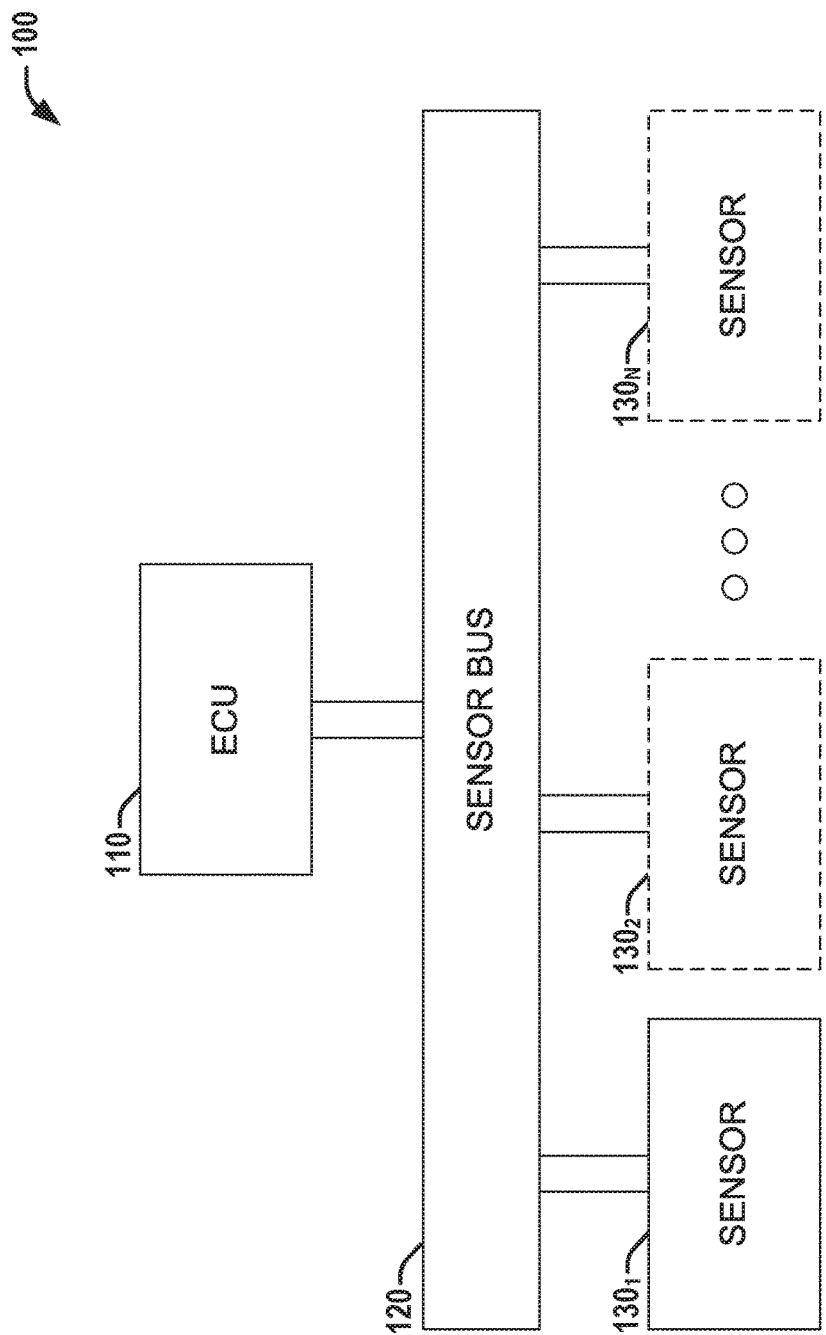
FIG. 1 is a block diagram illustrating a sensor system in accordance with one or more aspects or embodiments described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal). A component can also be referred to as a machine.

As another example, a component can be an apparatus with specific functionality provided by mechanical/machine parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

INTRODUCTION

Analog voltage interfaces provide high bandwidth and maximum flexibility in terms of system integration. When used as an external sensor interface, analog links suffer from high vulnerability (e.g., to voltage exposure, EMI, ESD), a high number of signal wires (especially for differential signal runs) as well as a lack of capability to transfer additional (e.g., diagnostic) data. A major benefit of current interfaces is the fact that the information transfer can be performed via the sensor supply lines, typically resulting in a two-wire interface.

For basic current interfaces, the low cost implementations of the physical layer exhibit a similar level of vulnerability in terms of EMI and ESD as seen on the voltage interfaces described above. In conventional implementations, several protocols are used ranging from a simple pulse train reflecting particular position indices (e.g., transmission speed sensors) up to advanced, proprietary protocols that included a limited set of diagnostic data in the data stream (e.g., the VDA protocol used for wheel speed sensors).

In consideration of the above described deficiencies, various components and techniques are disclosed that enable a sensor system, comprising a sensor device connected to an engine/electronic control unit (ECU) or other controller with a sensor bus or interface to increase data rates and reduce EMI issues. For example, a sensor can be communicatively coupled to a sensor interface and generate a sensor transmission with sensor data based on a sensed property (characteristic, such as temperature, pressure, flow, direction, magnetic property, polarity, or the like) of a physical parameter (property) (e.g., magnetism, heat, optic, force, or other parameter).

The ECU can be communicatively coupled to the sensor interface to receive the sensor transmission. In response to receiving the sensor transmission, the ECU can determine different aspects/modifications to the sensor communication protocol of the sensor transmission. For example, the ECU can determine whether one or more first sensor values of the sensor data are being transmitted along with one or more different second sensor values based on the sensor communication protocol, or different modifications of the protocol.

According to various aspects/embodiments separate encoding of the bits in rising and falling edges for single and dual channel sensors, which can represent different values, data words, or other payload data according to different corresponding rising and falling edge periods, or the same as repetitions to increase reliability, for example. This can enabe making the sensor communication protocol fully backwards compatible to the existing SPC/SENT signalling scheme, and offers a legacy receiver to at least decode the information contained in the falling edges. Additionally, a next generation release receiver can also detect a second channel, set of additional sensor values contained in the rising edges of the same transmission, as well as detect one or more further modifications of the transmission protocol.

The current SPC transmission scheme, in particular, can use the time between falling edges of the communication signal, and thus introduce a short low time at the beginning of a nibble. The same can be true for the SENT sensor communication protocol. Sensor communications can be further improved by utilizing the rising edges to increase the data rate of the transmission, along with other modifications of the sensor communication protocol herein.

To remain backwards compatible, not all possible combinations of the data symbols to be transmitted yield a backwards compatible data frame format. In the rising edges, 3 bits can be encoded to ensure backwards compatibility. Aspects/embodiments herein can further reduce the amount of data nibbles to also increase the transmission speed. As such, it can be possible for a transceiver to detect which protocol version the signal presented at the input offers. In addition, the synchronisation frame can take a very long time, in which the transceiver and sensor wait to synchronize the clocks, slowing down the communication speed. Additional aspects, embodiments or details of the disclosure are further described below with detail in reference to figures for overcoming such deficiencies.

Referring to FIG. 1, illustrated is a block diagram of a system 100 that facilitates high speed and robust communication with sensors according to various aspects disclosed herein. System 100 can include an ECU 110, a sensor bus/sensor interface 120, and one or more sensors $130_1$-$130_N$. Although the specific example embodiments discussed herein relate to vehicular sensor systems (e.g., in connection with motors, transmissions, etc.) system 100 can be implemented in a variety of settings to sample sensor data of substantially any characteristic/parameter/property (e.g., positions/angles, temperatures, magnetic fields, currents, rates of change thereof; chemical characteristics such as the presence, absence, or concentration of a substance; etc.) and communicate that sensor data via the high speed interface discussed herein.

The ECU 110 can be coupled to the sensor bus 120 (e.g., via a differential transceiver), and can communicate with the sensors $130_i$ via the sensor bus 120. ECU 110 can generate and output a synchronization signal. The synchronization signal or pulse can both trigger sampling by at least one of the sensors $130_i$ and be employed synchronize the one or more sensors $130_i$ to a common clock (e.g., the clock of the ECU, etc.). In some embodiments (e.g., embodiments with more than one sensor $130_i$), the synchronization signal can comprise an address element (e.g., one or more bits) that can indicate the sensor or sensors $130_i$ to sample sensor data. For example, the synchronization signal can include at least one synchronization bit (e.g., a dominant bit for synchronization), which can be (in some embodiments, e.g., those with multiple sensors $130_i$, etc.) followed by the address element, which can comprise one or more address bits, where the number of address bits determines the maximum number of sensors and/or sensor combinations that can be uniquely identified in the system (e.g., for 1 bit, two sensors or sensor combinations can be uniquely identified, for 2 bits, four, for 3 bits, eight, etc.).

In various embodiments, the length of the synchronization pulse can be the same or different length as data frames transmitted by the one or more sensors $130_i$ (which can have constant length data frames in such embodiments), and the address information can be contained in the duty cycle of the frame, which can determine the number of address bits based on the common length of the data frames and synchronization pulse.

The sensor bus 120 can be a single-ended bus or a differential bus (and ECU 110 and sensors $130_i$ can have differential transceivers with receive/transmit circuitry for transmitting and receiving via sensor bus 120), or be with full or half duplex communication properties. Communication via sensor bus 120 (e.g., of synchronization signals, sensor data, etc.) can employ any of a variety of line codings, such as, for example, a NRZ (non-return-to-zero) coding, which can include variants on NRZ such as NRZI (NRZ inverted), etc.

The one or more sensors $130_i$ can also be SPC or SENT sensors coupled to the sensor bus 120 (e.g., with each coupled via an associated differential transceiver, which can be included within a module of that sensor $130_i$ or a discrete component). The one or more sensors $130_i$ can receive the synchronization signal and can sample sensor data (e.g., via a sensor element) in response to the synchronization signal. Additionally, the one or more sensors $130_i$ can output the sampled sensor data to the sensor bus 120, where it can be received by the ECU 110.

In some embodiments (e.g., embodiments with more than one sensor $130_i$), each sensor $130_i$ can be associated with one or more addresses (e.g., an address unique to the sensor and/or one or more other addresses shared with at least one other sensor). In such embodiments, a synchronization signal can comprise an address element that indicates a selected address, and upon receiving the synchronization signal, each sensor $130_i$ associated with the selected address can sample associated sensor data. In various aspects where at least two sensors $130_i$ is associated with the selected address, this sampling can occur simultaneously for each of the at least two sensors $130_i$ associated with the selected address. In some aspects, the synchronization signal from ECU 110 can be a broadcast synchronization signal (e.g., via including a specific address element designated for the broadcast synchronization signal), wherein each of the sensors $130_i$ samples sensor data in response to the broadcast synchronization signal.

Any sensor $130_i$ that sampled sensor data in response to the synchronization signal can then output the sampled sensor data to the sensor bus 120. In various aspects, the outputting of the sensor data can be in response to the synchronization signal, for example, with the sensor data output based on the timing of the synchronization signal. Additionally, any sensor $130_i$ that is outputting sensor data to the sensor bus 120 can output one or more resynchronization bits (e.g., at the start of or otherwise within some or all data frames, etc.) that can be used to facilitate clock synchronization. In some embodiments, all data frames can have a constant length, while in other embodiments, some data frames (e.g., those from a first set of one or more sensors, etc.) can have a different length than some other data frames (e.g., those from a second set of one or more sensors, etc.).

For embodiments wherein more than one sensor $130_i$ samples sensor data based on a single synchronization signal (e.g., comprising an address element associated with each of the more than one sensors $130_i$), those more than one sensors $130_i$ can output their respective sensor data at different points in time (e.g., sequentially, with or without one outputting immediately after the other, etc.). The order of outputting sensor data can be predetermined, for example, based on addresses uniquely associated with the sensors $130_i$ (e.g., in order of increasing or decreasing address, etc.).

In an aspect, communication platform/resources 130 can include electronic components with associated circuitry that provide for processing and manipulation of received signal(s) and other signal(s) to be transmitted. The communication platform 130 can further comprise a receiver/transmitter or transceiver 116, which can transmit and receive signals and/or perform one or more processing operations on such signals (e.g., conversion from analog to digital upon reception, conversion from digital to analog upon transmission, etc.). In addition, transceiver 116 can divide a single data stream into multiple, parallel data streams, or perform the reciprocal operation.

Figure 2:
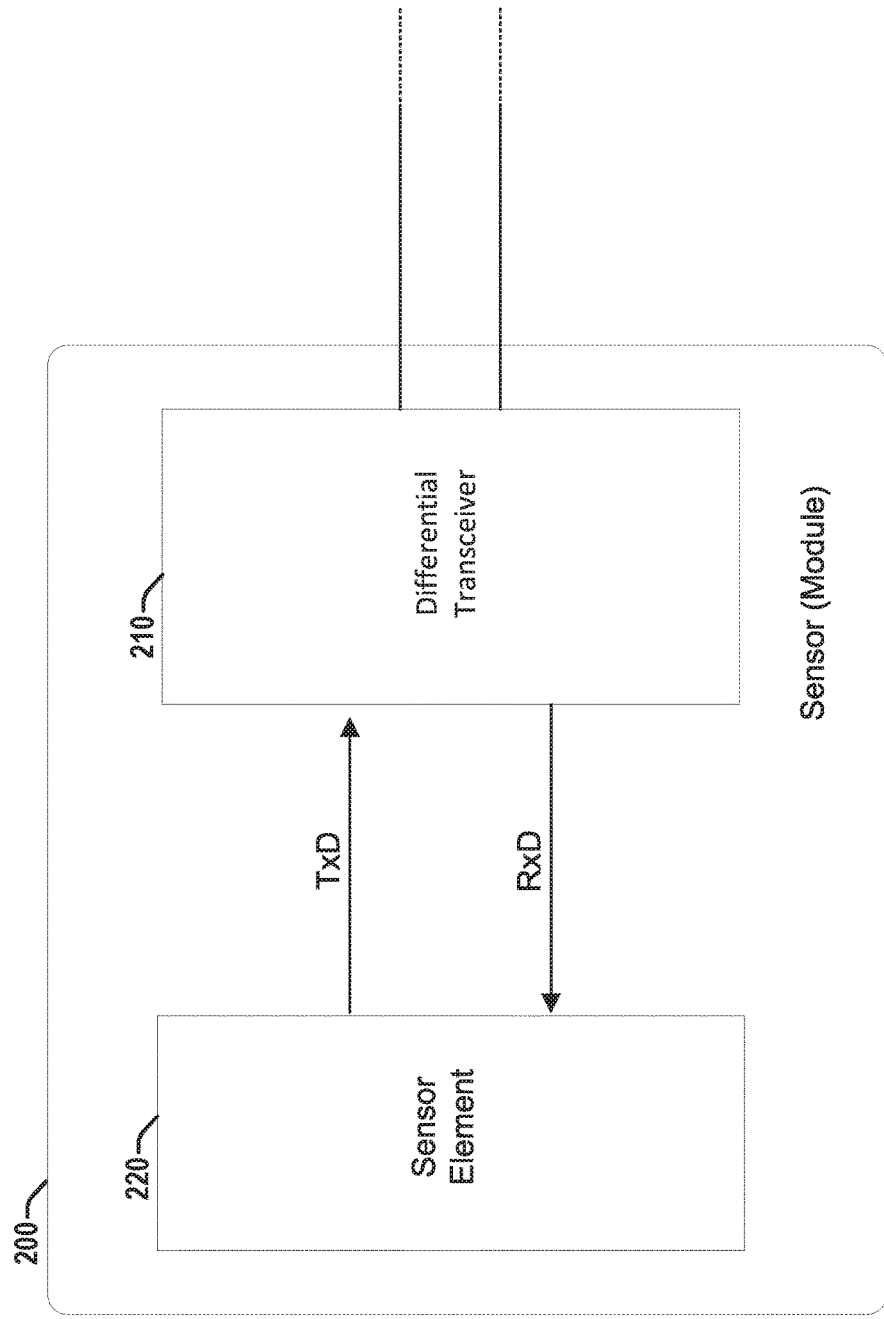
FIG. 2 is a block diagram illustrating components of a sensor device in accordance with one or more aspects or embodiments described herein.

Referring to FIG. 2, illustrated is a block diagram of a sensor device 200 configured to communicate via a sensor interface according to various aspects disclosed herein. Sensor 200 can include a differential 210, or other receiver/transmitter circuitry/transceiver 210, and a sensor element 220. In various aspects, sensor 200 can be employed as a sensor in connection with systems, methods, and apparatuses discussed herein, such as in system 100.

Transceiver 210 can include receive/transmit circuitry to process/generate data. The transceiver 210 can be coupled to a sensor bus 120, or the like. Transceiver 210 can transmit and receive data via a differential line coding, such as an NRZ coding, or other coding. For example, transceiver 210 can receive synchronization signals (e.g., such as those from an ECU such as ECU 110, etc.), and can transmit sampled sensor data (e.g., which can be transmitted along with one or more resynchronization bits, etc.). In some aspects, sampled sensor data can be transmitted in response to the synchronization signal (e.g., based at least in part on the timing of the synchronization signal, etc.).

In response to a synchronization signal being received by transceiver 210, sensor element 220 can sample sensor data (e.g., values associated with one or more sensed characteristics/properties of a physical parameter (mechanical, optical, magnetic parameter, or the like).

The sensor 200, as well as other sensor similarly depicted in this disclosure can operate as backwards compatible with SPC/SENT sensor communication protocols and enable the receiver to detect a protocol flavor to adjust the transmission parameters to improve the speed of the interface and the EMI performance.

Figure 3:
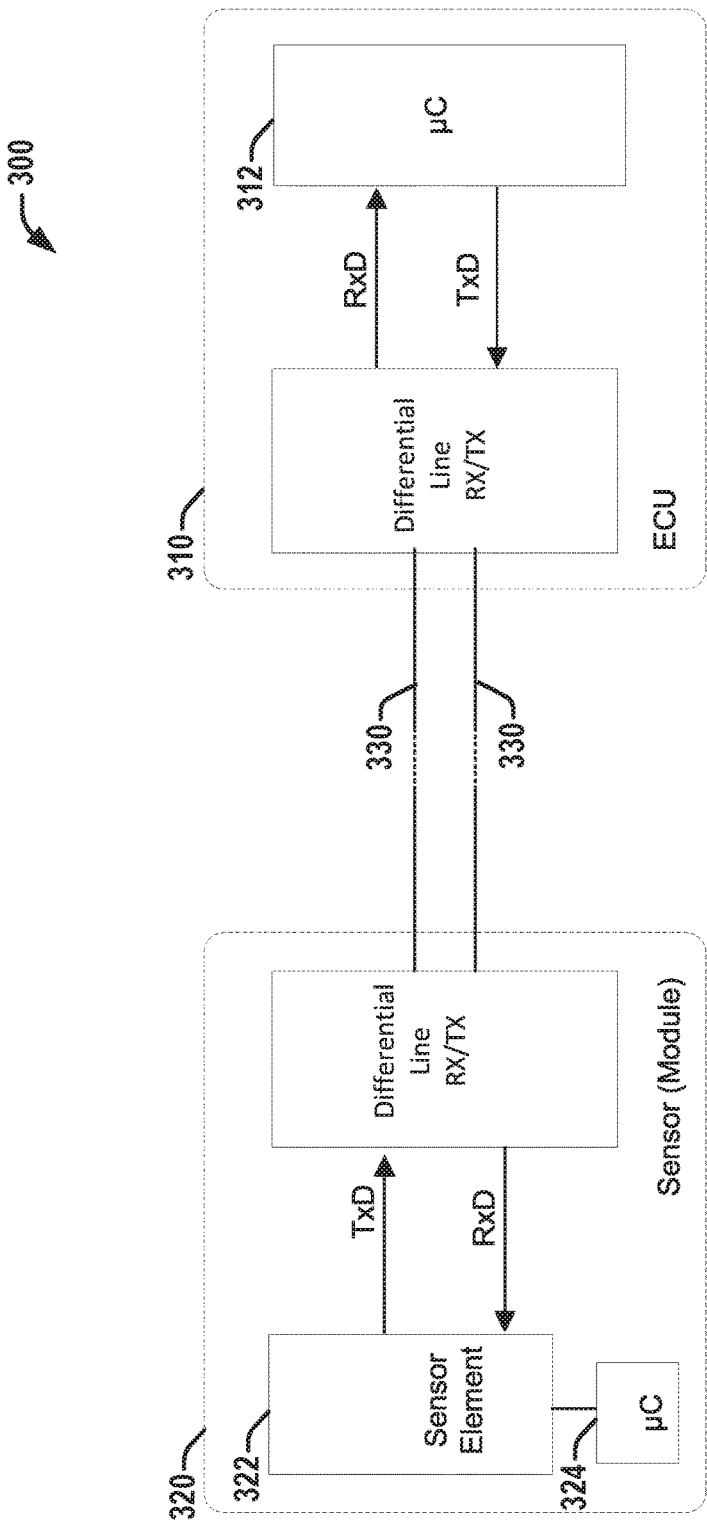
FIG. 3 is another block diagram illustrating a sensor system in accordance with one or more aspects or embodiments described herein.

Referring to FIG. 3, illustrated is a block diagram of a sensor-to-ECU connection employing a sensor interface 330, which can be a differential or a single ended bus to facilitate communications between the sensor 320 and ECU 310, according to various aspects described herein. The sensor 320 can include a sensor element 322 sensing a property of a physical parameter, or a characteristic of a physical property and generate, via one or more processing components 324, the sensor transmission based on sensed data from a change or a measure of the physical property/characteristic of the physical parameter/property. The ECU can include a microcontroller 312 comprising one or more processors to process/decode the sensor data of the transmissions.

The processor(s) 324/312 can include instructions. Instructions can comprise software, a program, an application, an applet, an app, or other executable code for causing at least any of the processors 324/312 to perform any one or more of the methodologies discussed herein. The instructions can reside, completely or partially, within at least one of the processors 324/312 (e.g., within the processor's cache memory), the memory/storage devices or any suitable combination thereof. Furthermore, any portion of the instructions can be transferred to the hardware resources from any combination of the peripheral devices and/or the databases. Accordingly, the memory of processors 324/312, the memory/storage devices, the peripheral devices, and the databases can be examples of computer-readable and machine-readable media.

In aspects, embodiments described herein can employ a digital signal transceiver as a physical layer for sensor data transmission, or a transceiver/receiver/transmit circuitry/component. In various embodiments/aspects described herein, an application specific data link layer (e.g., stack) can be employed that is optimized for interfacing to remote sensors with significantly reduced overhead. Besides the advantage of reduced hardware/software complexity, including dedicated synchronization (and resynchronization) bits (e.g., as opposed to employing bit stuffing) can ensure predictable frame lengths, which provides the advantage for sensing applications of enabling predictable interface latency times. In various embodiments, each sensor can employ a constant frame length. Alternatively, in other embodiments, some or all of the sensors can employ different frame lengths from other sensors.

Figure 4:
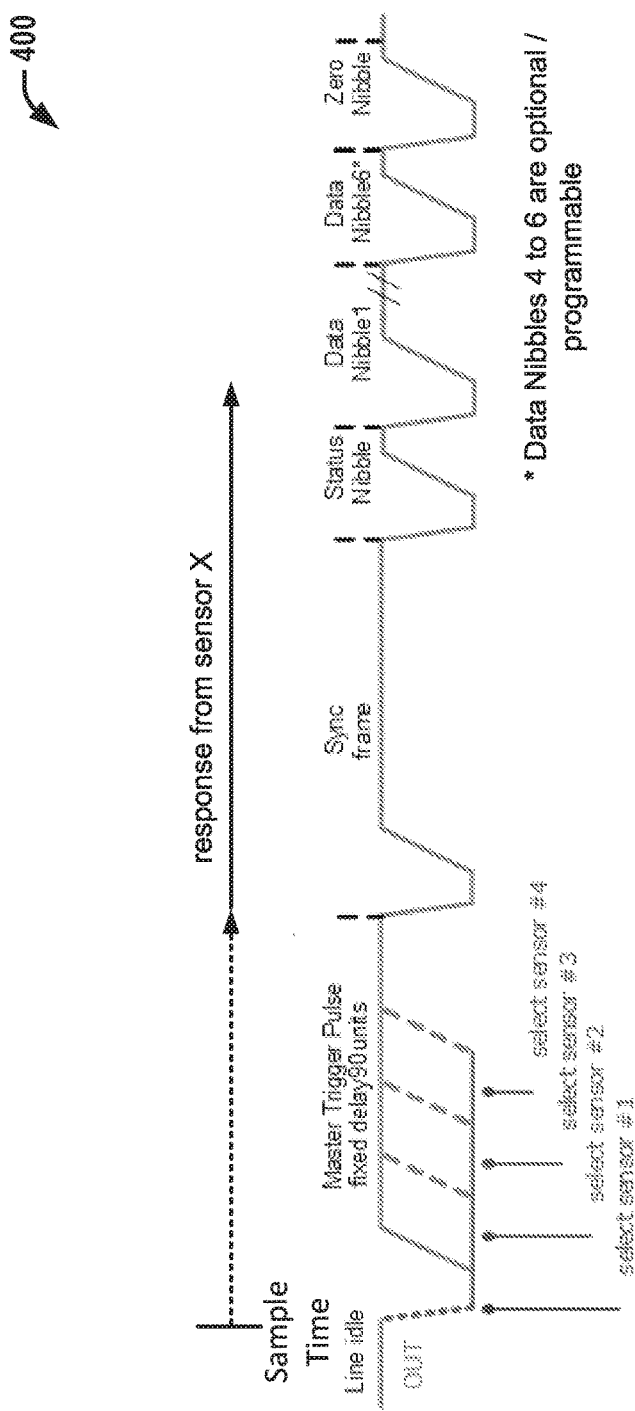
FIG. 4 is a diagram of a current signal timing of a sensor transmission according to various aspects or embodiments described herein.

Referring to FIG. 4, illustrated is an example of a sensor transmission protocol 400 for communication via a sensor interface according to various aspects described herein. Although FIG. 4 and other figures demonstrate a specific example transmission protocols 400 employed in connection with specific embodiments to illustrate aspects described herein, in other embodiments, transmission protocols with other characteristics can be employed. For example, the sensor 320 can utilize SPC/SENT sensor communication protocol(s) that only use the time between falling edges of the communication signal and thus introduce a short low time at the beginning of a data nibble. Additionally, the rising edges in can also be utilized as a second channel or second communication scheme of the protocol to increase the data rate of the transmission.

To remain backwards compatible, not all possible combinations of the data symbols to be transmitted may yield a backwards compatible data frame format. In the rising edges, for example the only 3 bits can be encoded to ensure backwards compatibility. Aspects/embodiments herein can operate reduce the amount of data nibbles and increase the transmission speed.

In various aspects, the encoding scheme provides the possibility of a fully backwards compatible SENT/SPC signal for single/dual channel data sensor transmission. Via a CRC check the automatic detection of encoding at the ECU 110 can be possible and a receiver can detect which protocol or modification of the protocol is being generated at the sensor 320.

The SPC communication in particular can enable different types of communication in the industry for sensors such as SAE SENT, which is a formulated standard by agreement and uses unit times (UTs). A UT is the time base for the protocol. SAE SENT currently uses 3 µs as a fixed UT. This can be slow and allow about one sensor value per millisecond. Another disadvantage here is that multiple sensors are not necessarily addressed in the standard so it is only one sensor to one receiver that can communicate with each other.

SPC, in particular, can provide the solution for a signaling structure that can be configured to address various sensors to obtain data therefrom. Using multiple sensors in a bus can be used and save on cables by not having one cable for each sensor; thus, only one bus line is enough and can still read out various sensor values as well. However, an increase in data transmission and transmission efficiency is demanded.

Sensor data can be encoded with logic information transferred by voltage modulation according to the illustrated SPC protocol. Other implementations may alternatively or additionally use current modulation. According to SPC, the time between two consecutive falling edges can define the value of about a four-bit data nibble, thus representing numbers between 0 and 15. The data nibbles transport the payload or sensor data from the sensor device 320 (220) to the ECU 310. The total transmission time of a data frame, therefore, depends on the transmitted data values, i.e. on the content. A single falling edge can be defined as a signal shape given by a low pulse or low time lasting more than four unit times (UT), followed by a high pulse lasting a predetermined time defined in the protocol, such as about 7 unit times, which could encode zero, for example. As such, to transmit a one ("1"), nine unit times can be the duration at the high time, which can increase until fifteen or 7+15, giving 22 UTs at the high position, extending the nibble longer as part of the encoding. In return, a receiver (e.g., ECU 310) can decode or process the information by measuring times between high-to-low transmissions. The high pulse can be submitted by applying a signal above a predetermined threshold on the wired connection, while the low pulse can be given by a signal below the same threshold or below a different threshold. All values or times defined in the protocol can also be multiples of the unit time UT.

Figure 5:
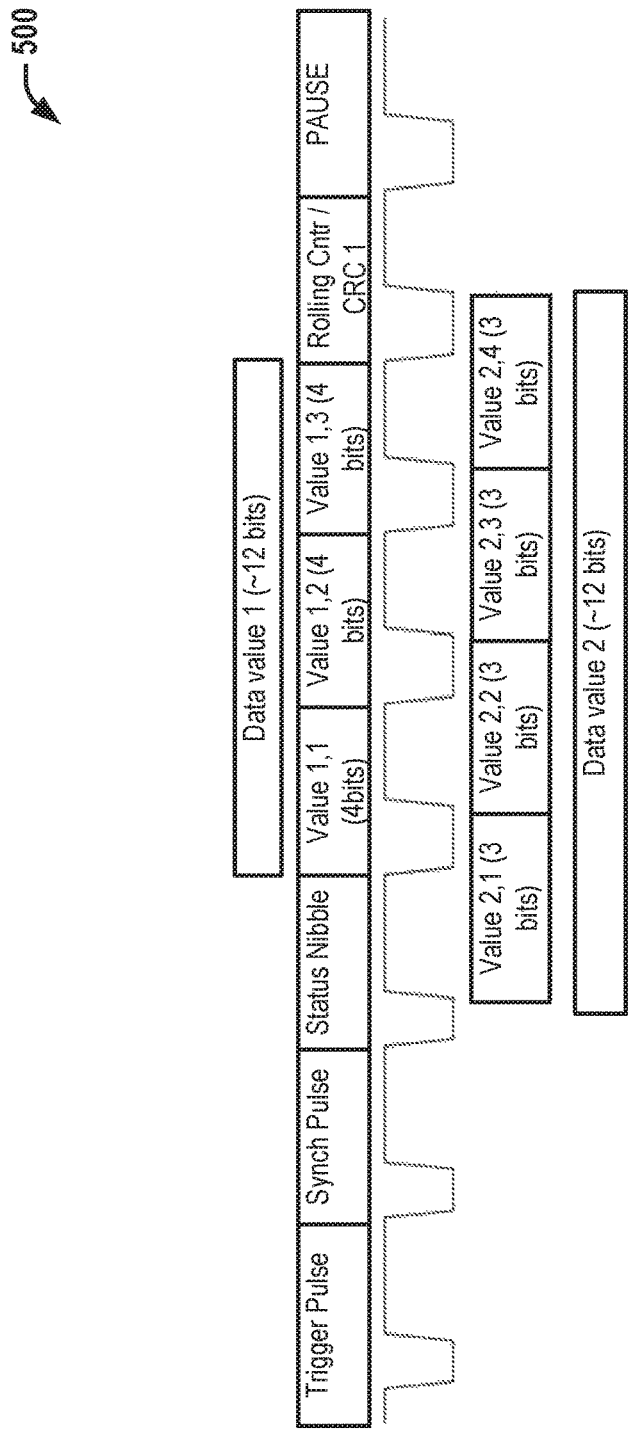
FIG. 5 is a diagram of waveforms of a sensor transmission according to various aspects or embodiments described herein.

Referring to FIG. 5, illustrated is another transmission protocol 400 for communication via a sensor interface according to various aspects described herein. The frame (e.g., single transmission 400) can start at sample time after line idle with a trigger pulse of the ECU, which can initiate the data transmission of the slave (e.g., sensors 0 thru 4, or other number depending on the length). As in the example of FIG. 4 above, the sensor transmission 500 includes the trigger pulse, the synchronization (synch) pulse, a status nibble, sensor data including a first set of data values (data value 1) encoded in the falling edges and a second set of data values (data value 2) as encoded in the rising edges, a rolling counter (cntr)/cyclic redundancy check (CRC 1) and a pause. The trigger pulse can be followed by a synchronization period of about 56 UTs, used by the sensor device to synchronize with the clock of the ECU processor 312, for example. The data of the sensor starts with a status nibble that can be between about 12-27 UTs, or more. The status nibble can be followed by data nibbles, for example, each of the data nibbles lasting between about 12-27 UTs, or more, for example, the data nibbles containing the sensor data, e.g. a Hall value/temperature information/other property value. The data nibbles can be followed by a CRC nibble lasting between about 12-27 UTs, or more, for example. The data frame can be terminated by an end pulse or pause pulse.

The trigger pulse, in particular the low time of the trigger pulse, can be used to transmit data from the ECU to the sensor device. According to some embodiments, a first key is transmitted from the ECU to the sensor device using the trigger pulse. A trigger pulse is not limited to a single waveform/transmission transiting from a high to a low state and subsequently back to the low state (a single falling edge). Further embodiments may also use more than one falling edge as a trigger pulse, depending on the particular implementation. Generally speaking, a trigger pulse is a signal waveform transmitted in order to start a data frame of a communication transmission and depends on the chosen protocol and its particular implementation.

In one embodiment, the falling edges of the transmission can be configured/encoded with data values so that the data times are measured from falling (high-to-low)-to-falling (high-to-low) edges. In addition, the rising edges can also be configured in the transmission with other data values so that data times are measured from rising (low-to-high)-to-rising (low-to-high) edges also in processing the sensor data via the interface 330, for example. These operations can significantly increase the data rate by configuring/processing two different variations or sensor communication schemes in a single sensor transmission according to a given sensor communication protocol (e.g., SPC/SENT protocol).

In another aspect/embodiment, at the end of the transmission 500 there is a cyclic redundancy check included such that the receiver or ECU 310 can decide whether the data transmitted was transmitted correctly or not, as well as whether particular modification or additional schemes to the sensor communication protocol are configured in the sensor transmission by the sensor device 320. A rolling counter could also optionally be utilized as a count mechanism. As such, a detect operation can be implemented by the ECU 310 or triggered by the sensor device 320 in the sensor transmission. In this, the ECU 310 could use only data values from a single CRC (as shown in the CRC 1/rolling counter data associated with the encoded data value 1) for computation of the cyclic redundancy check and then determine whether or not, based on this computation, whether to use the data value to the rising edges or not.

Figure 6:
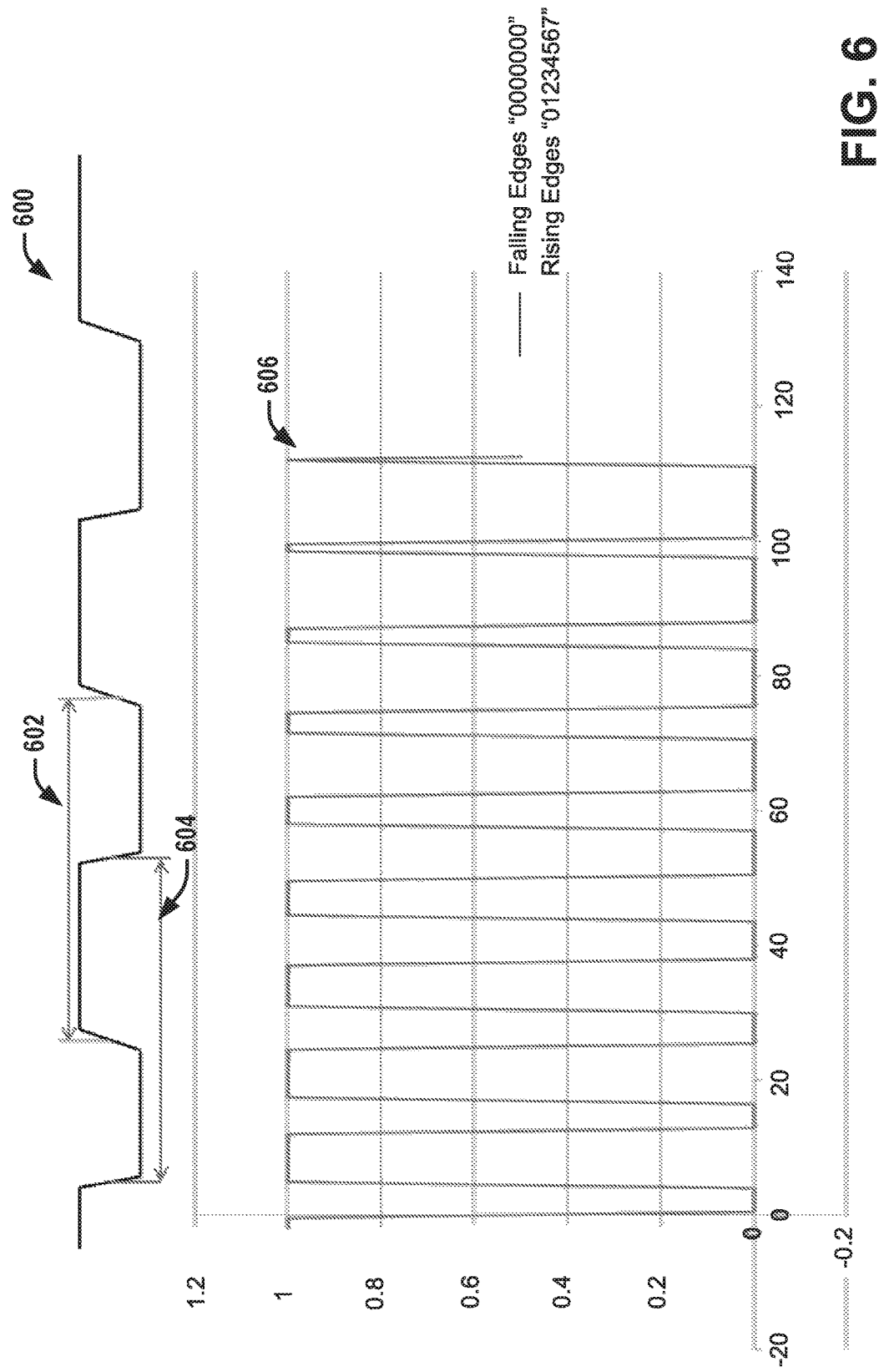
FIG. 6 is another block diagram of a sensor transmission with two protocol schemes according to various aspects or embodiments described herein.

In the example of FIG. 6, sensor values of sensor data in sensor transmissions 600 can be generated/configured by the sensor device (e.g., sensor 320 or other sensor herein) by utilizing the falling edges 604 for one set of sensor values and the rising edges 602 for another, second set of sensor values. In the bottom waveform 606 is an example of configuring the falling edges to encode zero all the time and at the rising edges increase the value of 0, 1, 2, 3, 4, 5, up to seven. To maintain compatibility with the legacy standard, the low time can have a pre-defined value, and then the high time can vary, or increase, for example, to encode data values up to about seven in the rising edges. Otherwise the waveform 606 or sensor transmissions with the sensor data can be too long and the edges can begin to be lost or vanish. In aspects herein, data values can thus be encoded according to different sensor protocol schemes or modifications of the protocol in the same transmission. Data values can be encoded in the falling edges and one or more data values on the rising edges as part of SPC protocol format of a transmission.

Figure 7:
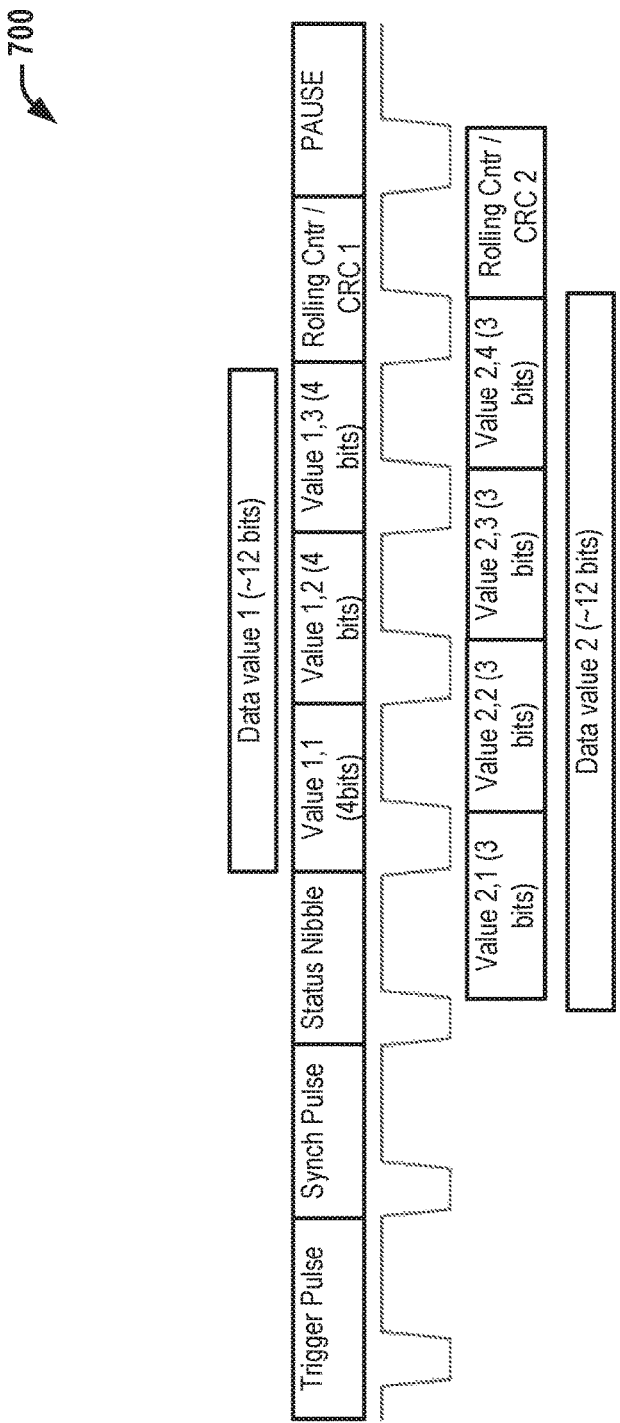
FIG. 7 is another block diagram of a sensor transmission with different modifications of protocol schemes according to various aspects or embodiments described herein.

Referring to FIG. 7, illustrated is another transmission protocol of a frame 700 for communication via a sensor interface according to various aspects described herein. The sensor device 320 (220), for example, can generate and transmit data nibbles with up to about four bits of data value, as shown. By using 12-bit data nibbles the particular encoding schemes can be implemented. From the SPC there is a trigger pulse, synchronization pulse, and the status and control nibble by encoding data values in falling edges and rising edges. One set of edges (e.g., the falling edges) can be constant to correspond with the standard or legacy devices, as in a conventional SPC signal, use for three nibbles, each containing four bits of data value. This gives data value number one with 12 bits. On the other hand, or in an additional scheme, the rising edges can also code the remaining three bits of data as we've seen before and by using four of the data nibbles we could actually include a second data value. So for a legacy SPC receiver, which does not really consider the rising edges the sensor data can be flexible to set them somewhere to encode additional data, and thus actually improving the speed and the data rate of the whole sensor 320 to the controller 310.

To fully separate the two data streams and to increase the error detection capability, one can also add a second CRC check on the data encoded in the rising edges. This could accompany an extension of the frame to the pause pulse which is complying to the standard. Then, both streams could be handled separately and the receiver could be configured accordingly to support the second data word.

With this frame 700, a currently existing SPC/SENT receiver interface (e.g., 330) with receiving controller 312 can at least detect all the data encoded in the falling edges as specified. However, if the data contained in the rising edges is considered for the CRC computation, the CRC of a standard transmission will not match and the ECU 310 or controller 312 thereof can detect that either errors occurred or whether there is also encoded data on the rising edges according to aspects herein. In the case where an error has occurred, either by an incorrect CRC match or rolling counter operation, a next generation receiver could initiate decoding of the rising edges data and re-compute the CRC to see if this is the case. If also in the second case a CRC mismatch occurs or other identification of an error by rolling counter or otherwise improper associated parameter related to transmission integrity, then errors have happened in the data transmission; if not, both schemes of the protocol can be utilized to process different sets of sensor values being communicated together in a same transmission.

In another aspect/embodiment, at the end of the transmission 700 there is at least two cyclic redundancy checks included such that the receiver or ECU 310 can decide whether the data transmitted was transmitted correctly or not, and by what scheme or modification of the sensor communication protocol. As such, a detect operation can be implemented by the ECU 310 or triggered by the sensor device 320 by the sensor transmission with more than one CRC/rolling counter value. The ECU 310 could use data values from multiple CRCs (as shown in the CRC 1/rolling counter data associated with the encoded data value 1, and with CRC 2/rolling counter associated with the encoded data value 2 as a separate scheme or channel of the transmission) for computation of the cyclic redundancy check for determining transmission error, and then determine whether or not, based on this computation, whether to use the data value to the rising edges or not, determine whether the sensor device 320 is operating with dual channels or different schemes in the sensor transmission.

For example, the sensor device 320 (220, or any other herein) can utilize data value one and data value two for computation of or encoding of the CRC. If the ECU 310 or other receiver comprises a conventional receiver only considering the falling edges alone, it would immediately obtain a mismatch between the CRC that it is receiving and which is computed to verify if the data is correct. In a second step, the receiver could then process further operations to also find the rising edges, decode the information stored in there and then further can re-compute the CRC in a second operation. If the received SPC/SENT transmission is received and the re-computed values match from the second CRC computation, then it knows there is also information encoded in the rising edges, and can continue processing sensor data from the transmission, thereby also increasing a data rate of the transmissions compared to legacy protocols.

Figure 8:
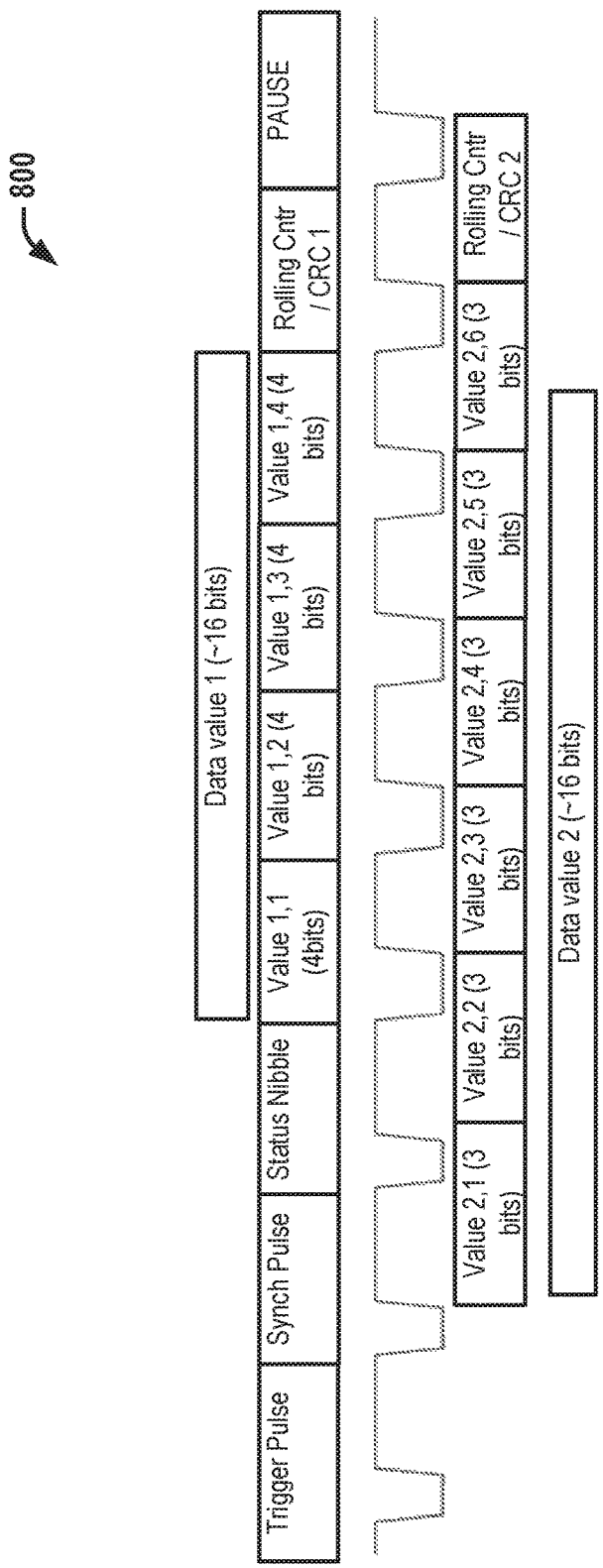
FIG. 8 is another block diagram of a sensor transmission with different modifications of protocol schemes according to various aspects or embodiments described herein.

Referring to FIG. 8, illustrates an example of a sensor transmission 800 based on a modification or variation of the sensor communication protocol. As above, the sensor transmission 800 includes the trigger pulse, the synchronization (synch) pulse, a status nibble, sensor data including a first set of data values (data value 1) encoded in the falling edges and a second set of data values (data value 2) as encoded in the rising edges, a rolling counter (cntr)/cyclic redundancy check (CRC 1) and a pause.

In another aspect, the sensor transmissions described herein, such as the sensor transmission 800 can be about 16 bits in amount associated with the data value 1. Additionally, another 16 bits can define a second channel or data scheme in the same transmission that is also approximately 16 bits in length. In contrast to the description above, an extension can be generated of the data values or sets of sensor data from about 12 bits to about 16 in either data value 1's channel/scheme, data value 2's, or both, which can be an additional or alternative other aspect to the other embodiments of the SPC/SENT sensor communication protocol transmission described herein.

For the transmission 800 with 16 bits of data, the data frame (or entire transmission or data payload) could be extended by one data nibble. Since in the worst case, only 3 bits can be encoded in the data nibbles on the rising edges (to still comply with the standard), the data encoding of the rising edges can be extended to/overlapping the synch pulse to achieve enough data symbols. This offers the possibility to use 18 bits for encoding and use 2 extra bits to increase the reliability and length of the CRC. Again, this transmission scheme could be fully backwards compatible to a current SPC/SENT receiver implementation.

In an aspect, the second data value can initiate within the synch pulse. This would be enabled because it is only important for a conventional sensor or receiver that this time from the falling edge to the next falling edge has a constant value. The rest is the rising edge that can actually be flexibly configured for the sensor device to choose. Additionally, if the receiver (e.g., ECU 310) cannot do anything with the rising edges, it can still detect the data values contained in the falling edges.

Figure 9:
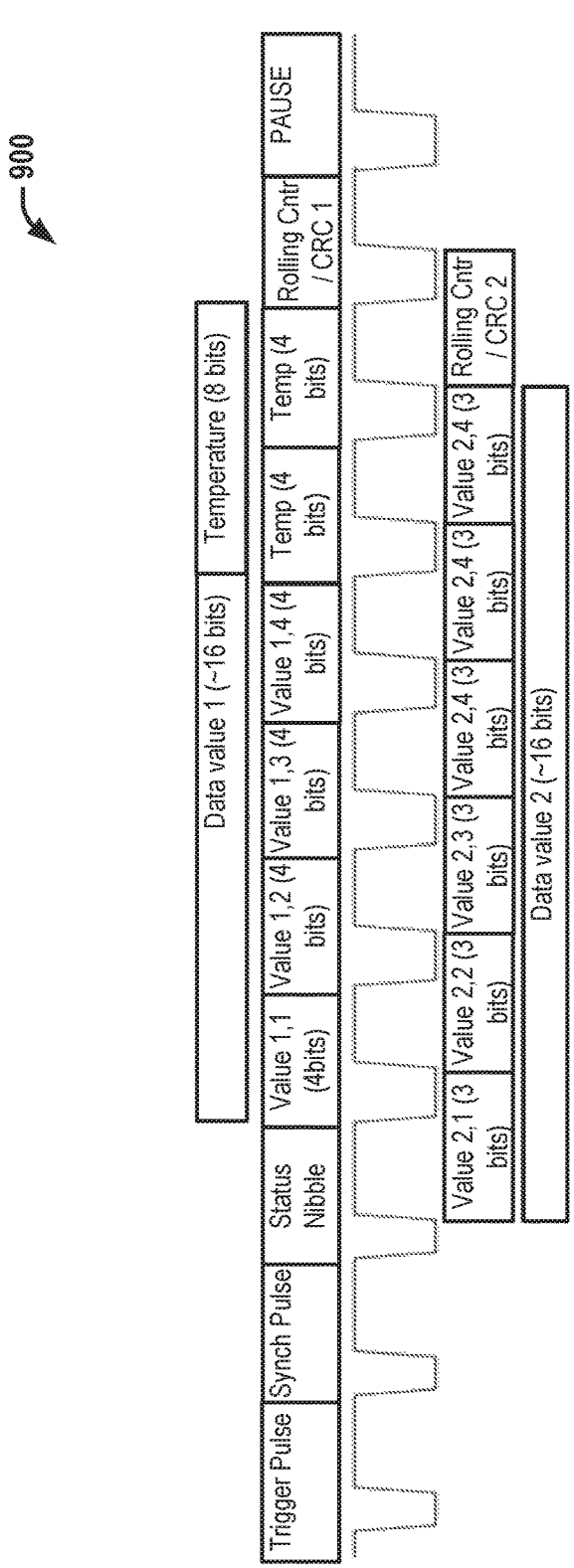
FIG. 9 is another block diagram of a sensor transmission with different modifications of protocol schemes according to various aspects or embodiments described herein.

Referring to FIG. 9, illustrated is sensor transmission 900 according to various aspects of SPC/SENT sensor communication protocols. In SPC or SENT sensor communications, a status nibble can be transmitted first so it contains information that the sensor device (e.g., 320, 220 or the like) is still doing well. If the sensor device 320, for example, monitors itself, it can provide a status indication of itself. If, for example, the sensor device 320 is measuring a magnetic field value as a property of a magnetic physical parameter/condition with a temperature sensing element thereat (as part of, or communicatively coupled to the sensor element 322 or micro 324 then the sensor device 320 can monitor itself and check whether the sensor is operating within its specs. For example, then it could indicate that the sensor is being used at a measured value for a determination by itself/the ECU 310 whether it is really reliable or not, and operating within the specification.

In other aspects, the temperature could be contained in the status nibble and because three bits are encoded in the rising edges for legacy devices to stay backwards compatible, a temperature or property value can be extended in at least the rising edges of the transmission of the status nibble. Also for the nibble(s) with temperature or other property from the conventional SPC it only has to remain at a certain level in the system to be a certain length according to the data symbol transmitted, but an adjustment of the rising edge of this symbol can still be possible. The frame or transmission can then consist of two extra nibbles containing 8 bit of temperature information. This offers also to encode the 16 bits of the secondary sensor value into the rising edges while appending the temperature value to at least one of the data values 1/2 as 8 bits in about two nibbles.

Alternatively, or additionally, the temperature value for monitoring the health of the sensor device 320 by the ECU 310 can be appended to a 12 bits of data as the data value 1/2, which is illustrated with accompanying description in other aspects above. Likewise, 8 bits could be appended before the CRC nibble, in which if the temperature is valid or satisfies a predetermined threshold corresponding to temperature or a property of the sensor, the CRC could be computed in response as part of a two-part data control check over the received values.

Figure 10:
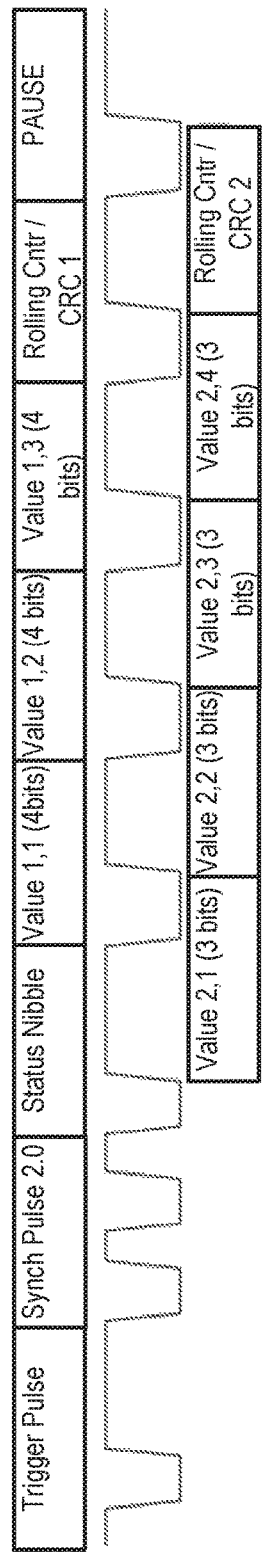
FIG. 10 is another block diagram of a sensor transmission with different modifications of protocol schemes according to various aspects or embodiments described herein.

Referring to FIG. 10, illustrated is sensor transmission 1000 according to various aspects of SPC/SENT sensor communication protocols. Here, an additional mechanism to instantaneously detect the use of a modified protocol can be generated by the sensor device 320, for example, with the configuration of extra pulses in the synchronisation pulse (referred to as "Synch Pulse 2.0") as shown.

The sensor transmission or sensor frame generated by the sensor device 320, for example, is an example of another embodiment with the configuration of the sync pulse 2.0 as a frame within the transmission or subframe. For the sync pulse, as disclosed above, it is primarily important that the time from the first falling edge to another falling edge has a constant value therein. Thus, if the receiver, ECU 310, or processor 312 actually knows that there are some rising edges coming in-between, it could actually also figure out some information based on how many extra pulses are coming in this time particular subframe or frame within the transmission as the Synch pulse 2.0.

In an aspect, the Synch pulse can be configured to indicate which mode, scheme of modification of the sensor communication protocol that is being configured by the sensor device 320, for example. A multitude of modes or modifications of the sensor communication protocol could be indicated to the ECU 310, for example. An indication or extra pulse(s) within the synch pulse as Synch Pulse 2.0 could include whether rising edges are being used between one another to increase the data rate of the sensor transmission or not, as well as a number of other modifications that can be indicated by one or more various extra pulses between rising edges of the synch pulse.

Figure 11:
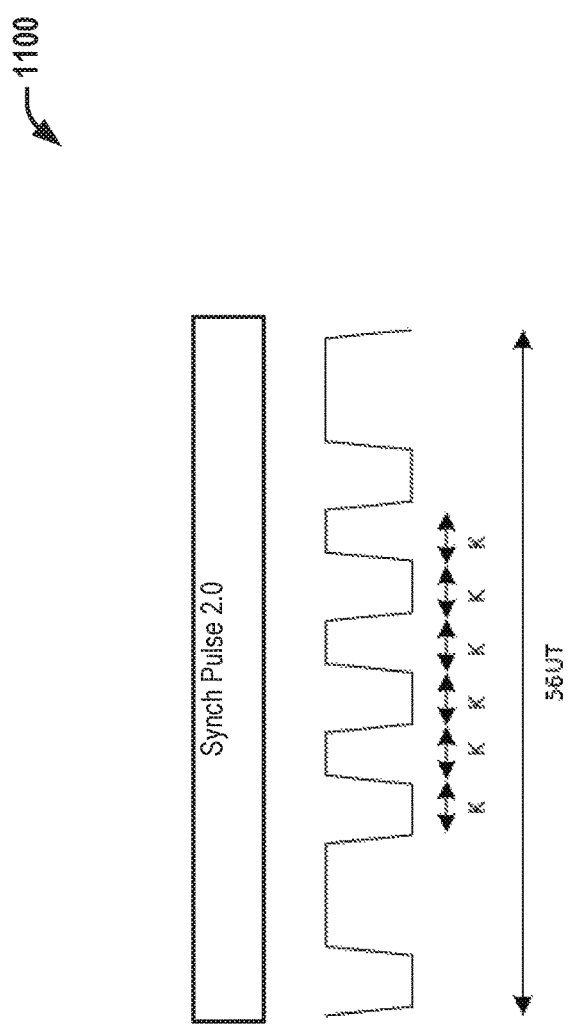
FIG. 11 is a block diagram of a sensor transmission synch pulse in a (sub)frame with different modifications of protocol schemes according to various aspects or embodiments described herein.

Referring to FIG. 11, illustrated is an example of Synch Pulse 2.0 (1100) as demonstrated in the transmission 1000 of FIG. 10. An increase in the number of transmitted data bits can be configured by the sensor device 320 and process by the ECU 310, for example, to determine a particular modification.

In above schemes, the synch pulse can keep its length to stay backwards compatible to existing SENT/SPC receivers or microcontroller/processor components 312. The main difference in the scheme 1100 of FIG. 11, which will make it not fully backwards compatible anymore to an existing SPC/SENT receiver, is an increased number of signal edges in the synchronisation pulse. A new receiver could be configured to ignore n falling edges in the synchronisation pulse and synchronize on a time defined by the first falling edge and the N-th falling edge following. By ignoring N−1 edges in the synchronisation pulse, also a communication mode can be encoded i.e. the receiver could automatically switch N configurations which are selected by multiple pulses in the synch period. This is visualized in the following figure, where each increment pulse consists of K UTs low signal and K UTs of high signal.

This could be formulated in a general manner, for example, by actually considering N extra falling edges for the pulse, wherein N is a positive integer of one or more. For example, where one edge is part of the synch pulse an extra falling edge could enable the microcontroller 312 or the receiver to determine/process that a sensor device 320 over the interface bus 330 is transmitting with a particular protocol variant. In particular, there could be a low time of K unit times and/or a high time of K unit times above within the synchronization pulse of totality 56 UT. In the example here, a typical falling edge for the sync pulse can be generated and then a following edge for closing the synch pulse as well as in between a variation or different pulses comprising one or more falling edges which can be received by receiver 310. Depending on how many extra pulses being received, the receiver could implicitly determine whether the sensor is transmitting either the 12 bits or either the 16 bits or other amount as part of data value 1/data value 2 or a plurality of data values, respectively.

In an aspect, the number of different extra pulses could be about eight or more, such as about sixteen different modifications or indications of a different variation in the sensor protocol to the ECU 310 Other indications or number could also be utilized as one of ordinary skill in the art could appreciate. The different modifications could be indications of size, length, multiple data value or channels/schemes of the transmission, a property (e.g., temperature) as present or not or a value thereof, as well as being SPC/SENT or some other modification to the sensor protocol of the sensor transmission.

Figure 12:
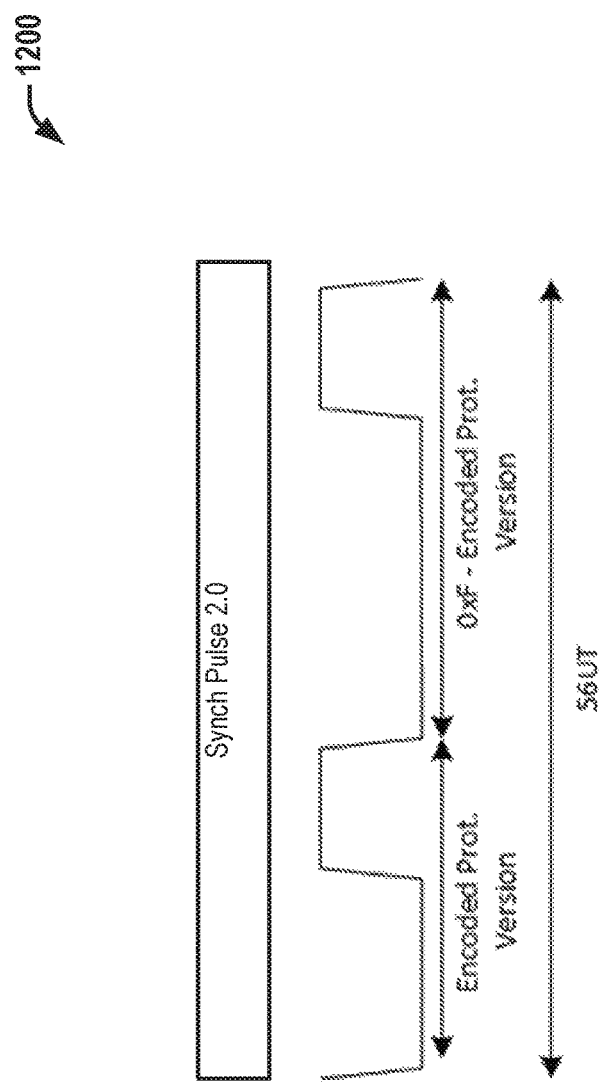
FIG. 12 is a block diagram of a sensor transmission synch pulse in a (sub)frame with different modifications of protocol schemes according to various aspects or embodiments described herein.

Referring to FIG. 12, illustrated is another example of the Synch Pulse 2.0. An alternative synch pulse could be used where the data encoded in a pulse width contained in the synch frame is used to transmit an extra data nibble. This nibble may contain the information of a used protocol version which also offers the receiver to automatically detect which encoding is used in the transmitted data frame. There, the data word is encoded such that the length of the overall synch pulse remains the same, and the coding of the extra data word is achieved by conventionally encoding an initialisation nibble (may contain the protocol variant or other information) followed by the inverse of this bit coding to doubly transmit the data and increase the reliability of the data transmission.

And in this we could actually doubly encode this protocol version here in the sync pulse by transmitting either a pulse switch indicating a protocol version 1 and the second pulse which is encoding the protocol with fifteen minus one (15-1). We have the data two times transmitted, and if both the values match the receiver actually knows which protocol version (e.g., protocol version 1) to have some redundancy here and increase the reliability of the system.

For example, here the ECU 310 knows or determines the 15-1, and determines that perhaps there is 16 modes and this is 15-1 and so also knows this is protocol one or a first mode. In the first section the transmission is transmitting one, and in the second section 15-1, or, in another example, two and 15-2 to indicate or derive protocol 2.

Figure 13:
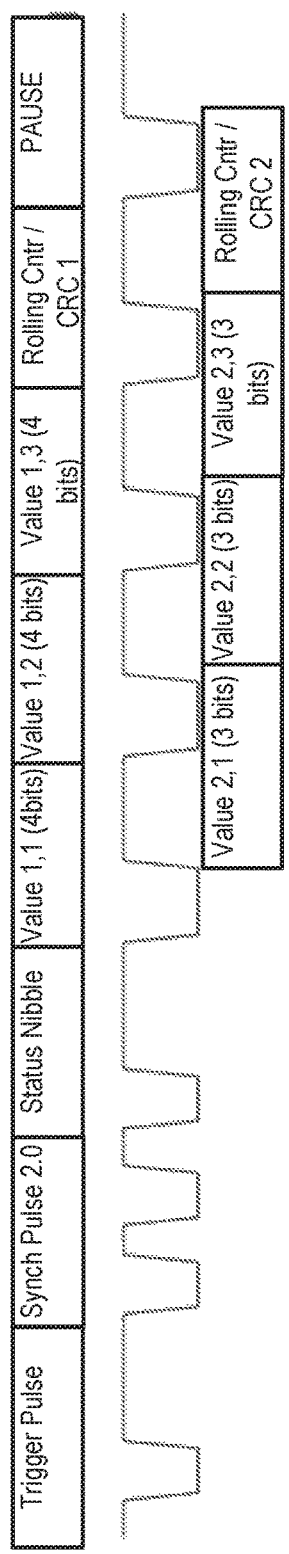
FIG. 13 is another block diagram of a sensor transmission with different modifications of protocol schemes according to various aspects or embodiments described herein.

Referring to FIG. 13, illustrated is another example sensor transmission based on a communication sensor protocol or a modification thereof. Here, the transmission 1300 or frame can utilize an offset SENT SPC communication. As discussed above, to stay backwards compatible problems can arise for encoding more than 3 bits on the rising edges due to backwards compatibility or legacy reasons. Otherwise, a signal which is always zero could be obtained for instance. As such, regarding FIG. 6 and the waveform 600 if one of the pulses slide a shorter signal will arise always giving zero can go only up to seven, from 0 to 7 which is actually three bits, and thus representing eight different states. If pushed ahead further, the transmission could actually already eliminate a rising edge and falling edge, no longer enabling the detection of anything. However, by extending the SENT/SPC standardized unit times by a constant offset such that the encoding of four bits in the rising edges is enabled then, only nine unit times as an offset to the conventional signal could be utilized. This on the other hand also increases the time that for each nibble because a longer wait is implemented, but increases the data rate by a factor of two as an advantage.

Below is a table indicate it is a constant offset of nine unit times added to the encoding, and thus, further enable a shortened overall signal because the encoding of the data values is not utilized really at the data nibbles or not extended to the status nibble, or on the other hand to the rolling counter/CRC.

Where the representation of "0"=12 UT, "1"=13 UT, . . . "F"=27 UT is not valid anymore. To allow coding of 4 bits into the rising edges, a novel definition of the number of UTs for a symbol is can be utilized. In this disclosure, for example, the increase can be configured by 9 UT as follows:

| DATA | SENT Rev. 4/SPC [UT] | Offset SENT/SPC [UT] |
|------|----------------------|----------------------|
| "0"  | 12                   | 21                   |
| "1"  | 13                   | 22                   |
| ...  | ...                  | ...                  |
| "F"  | 27                   | 36                   |

This is only one proposal to add the minimal possible offset, however, other increased offsets would also be possible but will decrease the data rate. Considering this proposal, the increase of the Signal time for transmitting the same data words can be computed to be +57% which comes with an increase of transmitted bits by +100%.

Advantages of the aspects and embodiments herein can include enabling at least two kinds of sensor signals, two-channel sensor/two sensor data values on the rising and falling edges, rising and/or falling edge. The sensor systems can enable the protocol version by the bus master by at least two mechanisms: by this CRC mechanism, or by this synch pulse to the zero with extra edges. The first two proposed methods can be fully backwards compatible to existing SPC Protocol, so a sensor which is using both edges would also be partially understood by a receiver that is decoding only the falling edges. Instead of increasing the speed by reducing the unit times, such as by using 3 microseconds, using one microsecond, which makes the whole thing much shorter, the data can be transmitted differently according to various schemes or modes and electromagnetic compatibility problems can be avoided resulting from reduced UT, while also increasing the data rate.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 14:
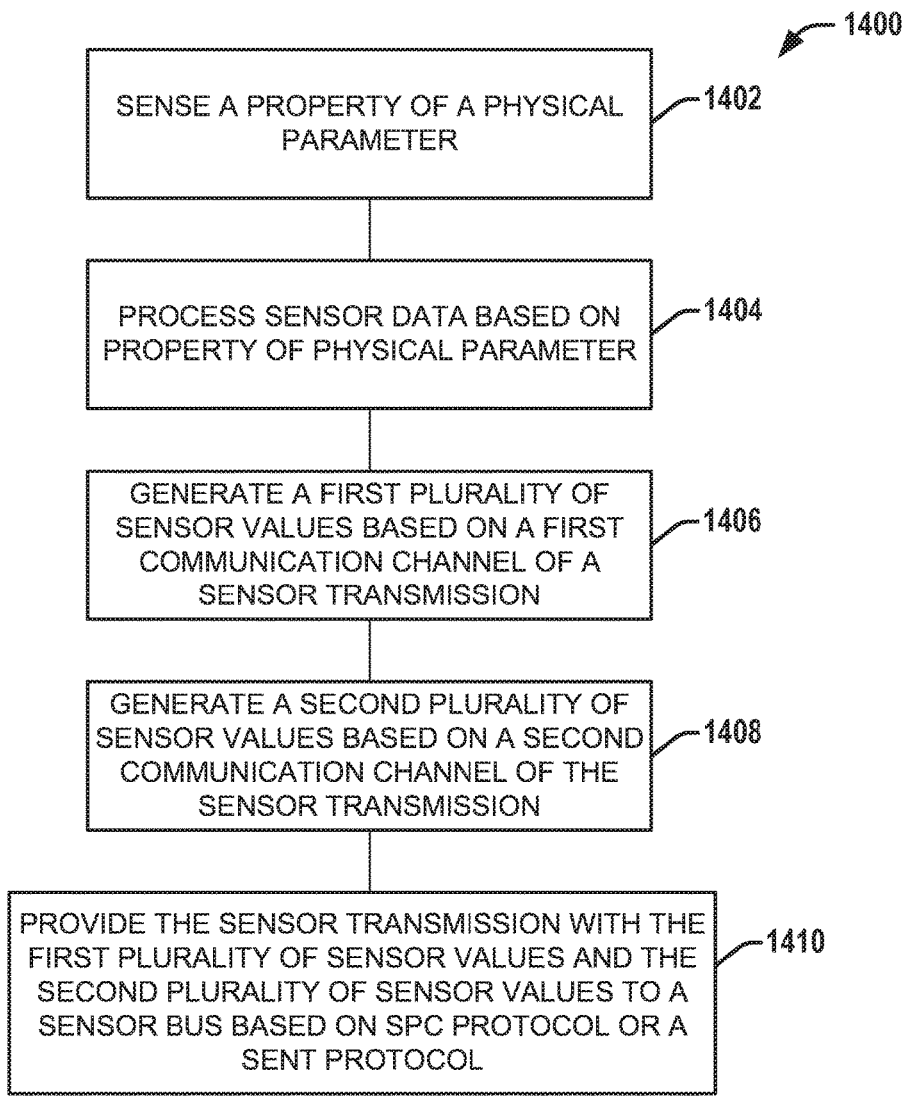
FIG. 14 is a process flow of a sensor transmission with different modifications of protocol schemes according to various aspects or embodiments described herein.

Referring to FIG. 14, is a process flow 1400 for a method of a sensor device for generating a sensor transmission according to various aspects/embodiments described herein.

At 1402, the process flow initiates with sensing, via a sensor element, a characteristic/property of a physical property/parameter.

At 1404, the sensor processes the sensor data based on the property of the physical parameter.

At 1406, the process flow 1400 further includes generating a first plurality of sensor values based on a first communication channel of a sensor transmission.

At 1408, the sensor device (e.g., 320, 220 or other sensor) generates a second plurality of sensor values based on a second communication channel of the same sensor transmission as the first plurality.

At 1410, the method includes providing the sensor transmission with the first plurality of sensor values and the second plurality of sensor values to a sensor bus based on short pulse width modulation (PWM) code (SPC) protocol or a single edge nibble transmission (SENT) protocol.

In one embodiment, the operations of the sensor, and correspondingly process operations by the ECU 310 receiving the transmission, can include increasing a data rate of the sensor bus by generating the sensor transmission based on a first communication scheme and a second communication scheme of the SPC protocol or the SENT protocol. Further, the sensor device 320 can generate one or more additional pulses within a synchronization pulse of the sensor transmissions to distinguish among a plurality of communication modes.

In another aspect, the first plurality of sensor values can be encoded with falling edges of the sensor transmission and the second plurality of sensor values with rising edges of the sensor transmission.

Alternatively, or additionally, the process flow can include providing a cyclic redundancy checks (CRC) or a rolling counter associated with at least one of: the first plurality of sensor values encoded in falling edges of the sensor transmission, or the second plurality of sensor values encoded in rising edges of the sensor transmission; and providing a sensor temperature with the first plurality of sensor values or the second plurality of sensor values.

Considering the signal transmissions that can be generated by the sensor device 320, a conventional SPC signal would not have a data value number two, or second set of data values, so it would comprise a trigger pulse, a sync pulse, a status nibble, three data nibbles, and then a CRC saving all the transmitted data, and be processed at a legacy ECU or controller as such. Configuring its encoding on the rising edges, and also wanting to save of course this first data value, the status nibble, the data value one, the data value two can be configured or computed into the CRC generation to get a different CRC than the one only having status nibble and data value one. This is actually now the basis on which a receiver could detect where there are some extra bits and coding in the signal. The receiver (e.g., ECU 310) is receiving the status nibble and all the data values, then also computing a CRC and comparing these two, where if they do not match then two options can be processed: an error occurred, or there is some extra data value encoded in the signal. Then the receiver could actually do another shot with this knowledge, and could also try to find the encoded three bits in the rising edges. Then it could actually take or re-compute the CRC to see if the re-computation matches, and if matching it knows the sensor is using this data encoding scheme. So it would increase a bit more complexity in the receiver but it would offer an additional data value in the case of an additional 16-bit data value and the receiver would actually be possible to auto detect this only based on the CRC computation here.

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a sensor system, comprising: a sensor device communicatively coupled to a sensor interface and configured to generate a sensor transmission comprising sensor data based on a sensed property of a physical parameter; an electronic control unit (ECU), communicatively coupled to the sensor interface, configured to receive the sensor transmission, determine a sensor communication protocol of the sensor transmission, determine one or more first sensor values of the sensor data from the sensor transmission, and determine one or more second sensor values of the sensor data from the sensor transmission based on the sensor communication protocol.

Example 2 includes the subject matter of Example 1, wherein the sensor system of claim 1, wherein the sensor device is further configured to selectively increase a data rate of the sensor interface by generating the sensor transmission based on a first communication scheme and a second communication scheme of the sensor communication protocol.

Example 3 includes the subject matter of any one of Examples 1-2, including or omitting any elements as optional, wherein the ECU is further configured to generate a determination of whether the first communication scheme of the sensor communication protocol is used alone or together with the second communication scheme of the sensor communication protocol in response to a cyclic redundancy check (CRC) or a rolling counter, and determine the one or more first sensor values and the one or more second sensor values of the sensor data based on the determination.

Example 4 includes the subject matter of any one of Examples 1-3, including or omitting any elements as optional, wherein the sensor device is further configured to generate the sensor transmission with the sensor communication protocol comprising a short pulse width modulation (PWM) code (SPC) protocol, or a single edge nibble transmission (SENT) protocol, comprising a defined number of nibbles with a number of bits to communicate the sensor data.

Example 5 includes the subject matter of any one of Examples 1-4, including or omitting any elements as optional, wherein the ECU is further configured to determine that the sensor communication protocol of the sensor transmission comprises a first communication scheme and a second communication scheme conveying different sensor values as the one or more first sensor values and the one or more second sensor values, respectively, based on a re-calculation of a CRC in response to an initial calculation indicating an error, or a mismatch with the sensor data of the sensor transmission.

Example 6 includes the subject matter of any one of Examples 1-5, including or omitting any elements as optional, wherein the ECU is configured to determine the one or more first sensor values of the sensor data from the sensor transmission based on a first communication scheme of the sensor communication protocol comprising an encoding of falling-to-falling edges of the sensor transmission, and determine the one or more second sensor values based on a second communication scheme of the sensor communication protocol comprising another encoding of rising-to-rising edges of the sensor transmission.

Example 7 includes the subject matter of any one of Examples 1-6, including or omitting any elements as optional, wherein the sensor device is further configured to generate a first CRC and the one or more first sensor values in the falling-to-falling edges of the sensor transmission, and a second CRC and the one or more second sensor values in the rising-to-rising edges of the sensor transmission.

Example 8 includes the subject matter of any one of Examples 1-7, including or omitting any elements as optional, wherein the sensor device is further configured to generate a temperature value in addition to and associated with the one or more first sensor values or the one or more second sensor values of the sensor transmission that indicates a current temperature of the sensor device.

Example 9 includes the subject matter of any one of Examples 1-8, including or omitting any elements as optional, wherein the temperature value comprises about eight bits, the one or more first sensor values comprise about twelve or about sixteen bits, and the one or more second sensor values comprise about twelve or about sixteen bits.

Example 10 is a sensor device, comprising: a sensor element configured to sense a property of a physical parameter; a sensor interface, coupled to the sensor element, configured to provide sensor data, to transmit circuitry, to transmit the sensor data on a sensor transmission; and one or more processing components, coupled to the sensor element and the sensor interface, configured to generate the sensor transmission based on the sensor data and a sensor communication protocol, and generate one or more first sensor values of the sensor data and one or more second sensor values of the sensor data based on different modifications of the sensor communication protocol.

Example 11 includes the subject matter of Example 10, wherein the one or more processing components further comprise generating different channels of the sensor transmission corresponding to a first communication scheme and a second communication scheme comprising the different modifications of the sensor communication protocol, wherein the first communication scheme is based on falling edges of the sensor transmission and the second communication scheme is based on rising edges of the sensor transmission.

Example 12 includes the subject matter of any one of Examples 10-11, including or omitting any elements as optional, wherein the one or more processing components are further configured to generate the sensor transmission with a synchronization pulse comprising a one or more additional pulses indicating different communication modes that configure the sensor transmission.

Example 13 includes the subject matter of any one of Examples 10-12, including or omitting any elements as optional, wherein at least one of the different communication modes comprises generating the one or more first sensor values within falling edges and repeating the one or more first sensor values within rising edges of the sensor transmission, based on the sensor communication protocol, to increase reliability.

Example 14 includes the subject matter of any one of Examples 10-13, including or omitting any elements as optional, wherein the one or more processing components are further configured to generate the sensor transmission comprising about twelve bits or about sixteen bits and a temperature value, corresponding to at least one of: the one or more first sensor values or the one or more second sensor values.

Example 15 includes the subject matter of any one of Examples 10-14, including or omitting any elements as optional, wherein the one or more processing components are further configured to encode three or less bits on rising edges corresponding to the one or more first sensor values or the one or more first sensor values based on a short pulse width modulation (PWM) code (SPC) protocol or a single edge nibble transmission (SENT) protocol, and generate an offset SPC or SENT to encode more than the three bits on the rising edges corresponding to the one or more first sensor values or the one or more first sensor values.

Example 16 is a method of a sensor device, comprising: sensing, via a sensor element, a property of a physical parameter; processing sensor data based on the property of the physical parameter; generating a first plurality of sensor values based on a first communication channel of a sensor transmission; generating a second plurality of sensor values based on a second communication channel of the sensor transmission; and providing the sensor transmission with the first plurality of sensor values and the second plurality of sensor values to a sensor bus based on short pulse width modulation (PWM) code (SPC) protocol or a single edge nibble transmission (SENT) protocol.

Example 17 includes the subject matter of Example 16, further comprising: selectively increase a data rate of the sensor bus by generating the sensor transmission based on a first communication scheme and a second communication scheme of the SPC protocol or the SENT protocol.

Example 18 includes the subject matter of any one of Examples 16-17, including or omitting any elements as optional, further comprising: generate one or more additional pulses within a synchronization pulse of the sensor transmissions to distinguish among a plurality of communication modes.

Example 19 includes the subject matter of any one of Examples 16-18, including or omitting any elements as optional, further comprising: encoding the first plurality of sensor values with falling edges of the sensor transmission and the second plurality of sensor values with rising edges of the sensor transmission.

Example 20 includes the subject matter of any one of Examples 16-19, including or omitting any elements as optional, further comprising: providing at least one of: a cyclic redundancy checks (CRC) or a rolling counter, associated with at least one of: the first plurality of sensor values encoded in falling edges of the sensor transmission or the second plurality of sensor values encoded in rising edges of the sensor transmission; and providing a sensor temperature with the first plurality of sensor values or the second plurality of sensor values.

Applications (e.g., program modules) can include routines, programs, components, data structures, etc., that perform particular tasks or implement particular abstract data types. Moreover, those skilled in the art will appreciate that the operations disclosed can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated mobile or personal computing devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media (e.g., one or more data stores) can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques, such as millimeter wave bands in the range of 30 GHz to 300 GHz, for example.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. A sensor system, comprising:
   a sensor device, communicatively coupled to a sensor interface, configured to generate a sensor transmission comprising sensor data based on a sensed property of a physical parameter, and selectively increase a data rate of the sensor interface by generating the sensor transmission based on a first communication scheme and a second communication scheme of a sensor communication protocol of the sensor transmission; and an electronic control unit (ECU), communicatively coupled to the sensor interface, configured to receive the sensor transmission, determine the sensor communication protocol, determine one or more first sensor values of the sensor data from the sensor transmission, and determine one or more second sensor values of the sensor data from the sensor transmission based on the sensor communication protocol.

2. The sensor system of claim 1, wherein the ECU is further configured to generate a determination of whether the first communication scheme of the sensor communication protocol is used alone or together with the second communication scheme of the sensor communication protocol in response to a cyclic redundancy check (CRC) or a rolling counter, and determine the one or more first sensor values and the one or more second sensor values of the sensor data based on the determination.

3. The sensor system of claim 1, wherein the sensor device is further configured to generate the sensor transmission with the sensor communication protocol comprising a short pulse width modulation (PWM) code (SPC) protocol, or a single edge nibble transmission (SENT) protocol, comprising a defined number of nibbles with a number of bits to communicate the sensor data.

4. The sensor system of claim 1, wherein the ECU is further configured to determine that the sensor communication protocol of the sensor transmission comprises the first communication scheme and the second communication scheme conveying different sensor values as the one or more first sensor values and the one or more second sensor values, respectively, based on a re-calculation of a cyclic redundancy check (CRC) in response to an initial calculation indicating an error, or a mismatch with the sensor data of the sensor transmission.

5. The sensor system of claim 1, wherein the ECU is configured to determine the one or more first sensor values of the sensor data from the sensor transmission based on the first communication scheme of the sensor communication protocol comprising an encoding of falling-to-falling edges of the sensor transmission, and determine the one or more second sensor values based on the second communication scheme of the sensor communication protocol comprising another encoding of rising-to-rising edges of the sensor transmission.

6. The sensor system of claim 5, wherein the sensor device is further configured to generate a first cyclic redundancy check (CRC) and the one or more first sensor values in the falling-to-falling edges of the sensor transmission, and a second CRC and the one or more second sensor values in the rising-to-rising edges of the sensor transmission.

7. The sensor system of claim 1, wherein the sensor device is further configured to generate a temperature value in addition to and associated with the one or more first sensor values or the one or more second sensor values of the sensor transmission that indicates a current temperature of the sensor device.

8. The sensor system of claim 7, wherein the temperature value comprises eight bits, the one or more first sensor values comprise twelve or sixteen bits, and the one or more second sensor values comprise twelve or sixteen bits.

9. A sensor device, comprising:
a sensor element configured to sense a property of a physical parameter;
a sensor interface, coupled to the sensor element, configured to provide sensor data, to transmit circuitry, to transmit the sensor data on a sensor transmission; and
one or more processing components, coupled to the sensor element and the sensor interface, configured to generate the sensor transmission based on the sensor data and a sensor communication protocol, generate one or more first sensor values of the sensor data and one or more second sensor values of the sensor data based on different modifications of the sensor communication protocol, and generate different channels of the sensor transmission corresponding to a first communication scheme and a second communication scheme comprising the different modifications of the sensor communication protocol.

10. The sensor device of claim 9, wherein the first communication scheme is based on falling edges of the sensor transmission and the second communication scheme is based on rising edges of the sensor transmission.

11. The sensor device of claim 9, wherein the one or more processing components are further configured to generate the sensor transmission with a synchronization pulse comprising a one or more additional pulses indicating different communication modes that configure the sensor transmission.

12. The sensor device of claim 11, wherein at least one of the different communication modes comprises generating the one or more first sensor values within falling edges and repeating the one or more first sensor values within rising edges of the sensor transmission, based on the sensor communication protocol, to increase reliability.

13. The sensor device of claim 9, wherein the one or more processing components are further configured to generate the sensor transmission comprising twelve bits or sixteen bits and a temperature value, corresponding to at least one of: the one or more first sensor values or the one or more second sensor values.

14. The sensor device of claim 9, wherein the one or more processing components are further configured to encode three, two, or one bit(s) on rising edges corresponding to the one or more first sensor values or the one or more first sensor values based on a short pulse width modulation (PWM) code (SPC) protocol or a single edge nibble transmission (SENT) protocol, and generate an offset SPC or SENT to encode more than the three, two, or one bit(s) on the rising edges corresponding to the one or more first sensor values or the one or more first sensor values.

15. A method of a sensor device, comprising:
sensing, via a sensor element, a property of a physical parameter;
processing sensor data based on the property of the physical parameter;
generating a first plurality of sensor values based on a first communication channel of a sensor transmission;
generating a second plurality of sensor values based on a second communication channel of the sensor transmission; and
providing the sensor transmission with the first plurality of sensor values and the second plurality of sensor values to a sensor bus based on short pulse width modulation (PWM) code (SPC) protocol or a single edge nibble transmission (SENT) protocol.

16. The method of claim 15, further comprising:
selectively increase a data rate of the sensor bus by generating the sensor transmission based on a first communication scheme and a second communication scheme of the SPC protocol or the SENT protocol.

17. The method of claim 15, further comprising:
generate one or more additional pulses within a synchronization pulse of the sensor transmissions to distinguish among a plurality of communication modes.

18. The method of claim 15, further comprising:
encoding the first plurality of sensor values with falling edges of the sensor transmission and the second plurality of sensor values with rising edges of the sensor transmission.

19. The method of claim 15, further comprising:
providing at least one of: a cyclic redundancy checks (CRC) or a rolling counter, associated with at least one of: the first plurality of sensor values encoded in falling edges of the sensor transmission or the second plurality of sensor values encoded in rising edges of the sensor transmission; and
providing a sensor temperature with the first plurality of sensor values or the second plurality of sensor values.

* * * * *